United States Patent
Costa et al.

(10) Patent No.: US 9,152,193 B2
(45) Date of Patent: Oct. 6, 2015

(54) POWER SUPPLY ACOUSTIC NOISE MITIGATION

(71) Applicant: Apple Inc., Cupertino, CA (US)

(72) Inventors: Paul J. Costa, Sunnyvale, CA (US); David R. Cox, Los Gatos, CA (US); Bharat K. Patel, San Jose, CA (US); Nicholas W. Ruhter, San Francisco, CA (US); Xiaoyang Zhang, Fremont, CA (US); Steve X. Zhou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 244 days.

(21) Appl. No.: 13/691,678

(22) Filed: Nov. 30, 2012

(65) Prior Publication Data
US 2013/0332765 A1 Dec. 12, 2013

Related U.S. Application Data

(60) Provisional application No. 61/656,506, filed on Jun. 6, 2012.

(51) Int. Cl.
*G06F 1/24* (2006.01)
*G06F 1/26* (2006.01)

(52) U.S. Cl.
CPC ........................................ *G06F 1/26* (2013.01)

(58) Field of Classification Search
CPC .................................................... G06F 1/26
USPC ................................................. 713/300, 320
See application file for complete search history.

(56) References Cited

U.S. PATENT DOCUMENTS

| | | | | |
|---|---|---|---|---|
| 4,937,728 A * | 6/1990 | Leonardi | ........................ | 363/97 |
| 5,410,713 A * | 4/1995 | White et al. | ................... | 713/330 |
| 5,812,383 A * | 9/1998 | Majid et al. | ................ | 363/21.05 |
| 7,471,530 B2 * | 12/2008 | Balakrishnan et al. | ......... | 363/95 |
| 7,830,121 B2 | 11/2010 | Sasaki | | |
| 8,077,878 B2 | 12/2011 | Keehr | | |
| 8,305,052 B2 * | 11/2012 | Batikoff et al. | ............... | 323/222 |
| 8,519,688 B2 * | 8/2013 | Halberstadt | ................... | 323/282 |
| 2005/0081072 A1 * | 4/2005 | Lee | ............................... | 713/320 |
| 2008/0131160 A1 | 6/2008 | Mitsuoka et al. | | |
| 2009/0080222 A1 * | 3/2009 | Popescu et al. | ................. | 363/20 |

(Continued)

FOREIGN PATENT DOCUMENTS

| KR | 10-2003-0018401 | 3/2003 |
|---|---|---|
| KR | 10-2008-0049309 | 6/2008 |

(Continued)

OTHER PUBLICATIONS

PCT/US2013/041812. Int'l Search Report & Written Opinion (Aug. 27, 2013).

*Primary Examiner* — Mark Connolly
(74) *Attorney, Agent, or Firm* — Downey Brand LLP

(57) ABSTRACT

A method and system for reducing acoustic power supply noise, specifically acoustic noise related to power supply switching frequencies in a computing device, is disclosed. In one embodiment, a controller can monitor power consumed by the computing device, and an operational state of the computing device can be determined. If the computing device is in a first operational state and the power consumed is greater than a threshold amount, then the power supply can be operated at a first switching frequency or mode of operation, thereby avoiding switching frequencies that can produce acoustic noise.

18 Claims, 4 Drawing Sheets

(56) References Cited

U.S. PATENT DOCUMENTS

| | | |
|---|---|---|
| 2009/0295344 A1 | 12/2009 | Qu |
| 2010/0185884 A1* | 7/2010 | Chen et al. .................... 713/321 |
| 2011/0006742 A1* | 1/2011 | Teggatz et al. ................ 323/234 |
| 2012/0078556 A1* | 3/2012 | Holmberg et al. .............. 702/64 |
| 2012/0086355 A1 | 4/2012 | Klier |

FOREIGN PATENT DOCUMENTS

| | | |
|---|---|---|
| KR | 10-2010-0008118 | 1/2010 |
| KR | 10-2011-0095771 | 8/2011 |

* cited by examiner

POWER SUPPLY ACOUSTIC NOISE MITIGATION

CROSS-REFERENCE TO RELATED APPLICATIONS

This application claims the benefit of U.S. Provisional Patent Application No. 61/656,506, filed Jun. 6, 2012 and entitled "POWER SUPPLY ACOUSTIC NOISE MITIGATION" by COSTA et al., which is incorporated by reference herein in its entirety for all purposes.

FIELD OF THE DESCRIBED EMBODIMENTS

The described embodiments relate generally to power supplies and more particularly to reducing acoustic noise stemming from power supply operation.

BACKGROUND

Electronic devices can operate with low voltage direct current (DC) power. Sometimes the DC power can be sourced from a battery, especially in mobile or cordless electronic devices. Other times, electronic devices can be powered with an alternating current (AC) power supply that can produce one or more DC voltages for device operation. Often times, electrical efficiency can be an important performance metric for electronic devices. Electrical efficiency can be a measure of the overall efficiency of a power supply with respect to converting an AC line voltage to the one or more DC voltages. Some electronic devices use switching power supplies because they can be relatively compact and relatively power efficient, especially when operated from about one half to full output capacity. For example, a 500 watt switching power supply may operate at 87% efficiency when supply from 250 to 500 watts. Other times, however, when operating at low output levels such as 10 watts, regular switching power supply efficiency can drop to lower levels (75%, for example).

To help efficiency performance during low load operation, some switching power supplies offer a burst-mode of operation. During burst-mode, the switching power supply can function for "bursts" of time. A switching power supply can switch an output transistor at a fairly high frequency such as 250 KHz. During burst-mode, the power supply can alter switching frequencies for bursts of time, effectively changing (slowing down) the switching rate. This can result in more output droop, but can increase overall efficiency since the power supply is not running continuously. Because power supply burst-mode operation is only applicable when the power supply is operating at relatively low current loads, operational mode selection is typically performed by the power supply. The power supply can measure the supplied load current and automatically make the mode determination without any interaction from the load. However to keep power supply costs low, current load sensing may not be too sensitive. As a result, burst-mode can be enabled at widely variable current loads. Further, the current sensing and amplification circuitry can consume power when they operate, which can add to a power loss overhead for the power supply, especially at light loads.

One disadvantage of burst-mode power supply operation is that the power supply can exhibit increased acoustic noise. Under normal operation, a switching power supply can operate at relatively high frequencies, well above the range of human hearing, such as 250 KHz for example. Operating in burst-mode, the switching frequency can effectively become lower, even below 20 KHz, where power supply operation can become audible. Audible noise can come from power supply components, such as ceramic capacitors, that emit noise as a signal frequency enters a range typically sensitive to human hearing. Some burst-mode capable power supplies can change switching frequencies in response to output current. Acoustic noise from the power supply can be frequency dependent; and as such, different switching frequencies can be acoustically noisier than others. For example, some users can choose to charge accessories (cell phones, for example) through a computing device. When charging while the computing device is in a low power state, the power supply can operate in burst-mode, but can change switching frequencies as the accessory charges and thereby produce varying acoustic noise. In some cases, the strength of the audible noise can be directly proportional to a load level seen by the power supply as the power supply enters burst mode.

SUMMARY OF THE DESCRIBED EMBODIMENTS

This paper describes various embodiments that relate to power supplies and more particularly to reducing acoustic noise stemming from power supply operation.

According to one embodiment of the present invention, a method for controlling a power supply operable in at least two operating modes, the power supply being in operative communication with a computing device, is disclosed. The method includes determining an operational state of the computing device, measuring current supplied to the computing device by the power supply based on the determining, and configuring the power supply to operate in a first operating mode of the at least two operating modes if the current measurement is greater than a predetermined amount through a dedicated control line.

According to another embodiment of the invention, a method for controlling a power supply operable in at least two operating modes, the power supply being in operative communication with a computing device, is disclosed. The method includes determining an operational state of the computing device and configuring the power supply to selectively operate in a first operating mode of the at least two operating modes based on the determined operational state through a dedicated control line.

According to another embodiment of the invention, a system for reducing acoustic power supply noise includes a computing device, a power supply operable in at least two operating modes and in operative communication with the computing device, and a controller configured to monitor power consumed by the computer device. The controller is further configured to selectively direct the power supply to operate in a first operating mode of the at least two operating modes to reduce acoustic noise generated through the power supply based on the monitored power consumption.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

Various aspects of this disclosure may be better understood upon reading the following detailed description and upon reference to the drawings in which.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Computing devices can include burst-mode capable switching power supplies. These power supplies can enable some increase of efficiency when the computing device is operating in a low power state such as an off state or a sleep state. Burst-mode operation can allow the switching frequency of the switching power supply to be reduced and can vary under low load (low power state) conditions. For example, a typical switching frequency might be 250 KHz, but in burst-mode operation, the frequency can be reduced to 20 KHz or lower. Unfortunately, the lower switching frequencies can induce the power supply to produce acoustic noise, often times at output loads greater than a low power state, but less than normal operation of the computing device.

In one embodiment, a burst-mode controller can be used in conjunction with a burst-mode capable power supply. The burst-mode controller can monitor current supplied by the power supply and also determine operational modes of the computing device. The burst-mode controller can determine under what conditions the power supply operates in burst-mode.

Figure 1:
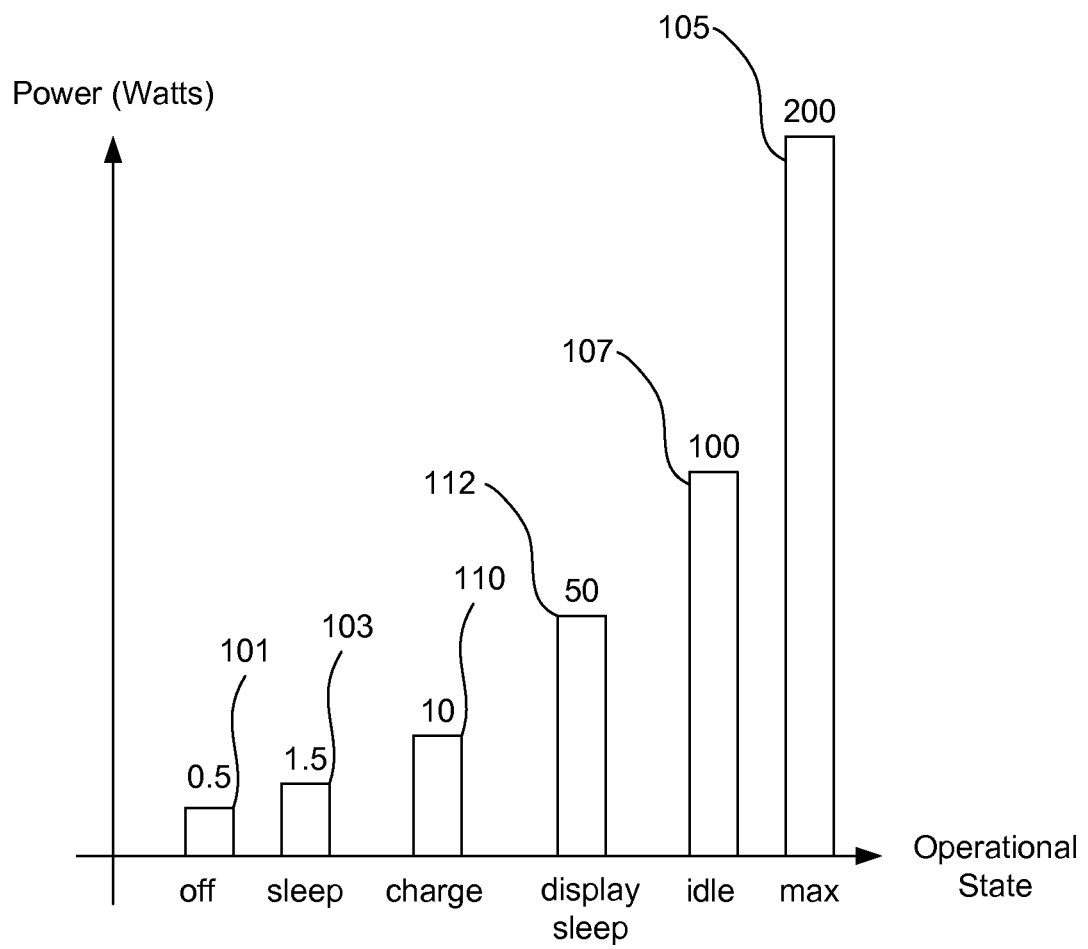
FIG. 1 is a graph illustrating possible operating states of an exemplary computing device powered by a switching power supply.
Figure 1:
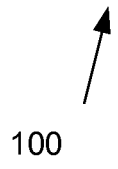

FIG. 1 is a graph 100 illustrating possible operating states of an exemplary computing device powered by a switching power supply. Although the graph 100 is not to scale, graph 100 can serve to illustrate power consumption amounts associated with different operating states. The power consumption values set forth are merely illustrative as power levels that can be associated with a computing device. Other computing devices can have other power levels. In this example, the computing device has a maximum power draw of 200 watts. Other embodiments of a computing device can consume more or less power at a maximum operating state.

Each operating state of a computing device can have an associated amount of power consumption For operating states with relatively low power consumption rates, such as off state 101 which can draw 0.5 watts and sleep state 103 which can draw 1.5 watts, the switching power supply can operate in burst-mode. The relatively low amounts of power can generally be easily supplied by the power supply with relatively no audible output. In contrast, for operating states with relatively high amounts of power consumption, such as idle state 107 which can draw 100 watts or max operation state 105 which can draw 200 watts, the power supply can operate in non-burst-mode. The associated high switching rates of non-burst-mode can help the power supply efficiently provide power with relatively no or low audible output.

A problem arises with certain operating states that can draw slightly more power than sleep state 103. For example a charge state 110 can exist where the computing device is essentially in off state 101 or sleep state 103, yet still provide power to a peripheral port, such as a universal serial bus (USB) port to enable the charging of USB enabled accessories. The charge state 110 can still have relatively low power consumption, such as the 10 watt example shown in FIG. 1. Thus, charge state 110 draws little power compared to idle state 107 at 100 watts or even display sleep state 112 at 50 watts. However, the 10 watts associated with charge state 110 typically is still small with respect to power supply capacity (200 watts in this example), so the power supply can operate in burst-mode. The slightly higher current demands of charge state 110 can affect the power supply in that burst-mode operation, under the charge state 110 current demands, and can emit undesirable acoustic noise.

Many power supplies can govern themselves regarding burst-mode operation, by switching to burst-mode operation when output current draw is low. However, because of design constraints, many power supplies can lack an accurate current measurement mechanism and as a result, the power supply can remain in burst-mode during certain operational states and generate acoustic noise.

One embodiment of a computing device can include a burst-mode controller configured to monitor power supply current draw and also determine an operational state of the computing device. The computing device can also include a switching power supply that can accept a burst-mode control signal to configure power supply operation. By evaluating current draw and operational state, the burst-mode controller can more precisely direct the power supply mode operation.

Figure 2:
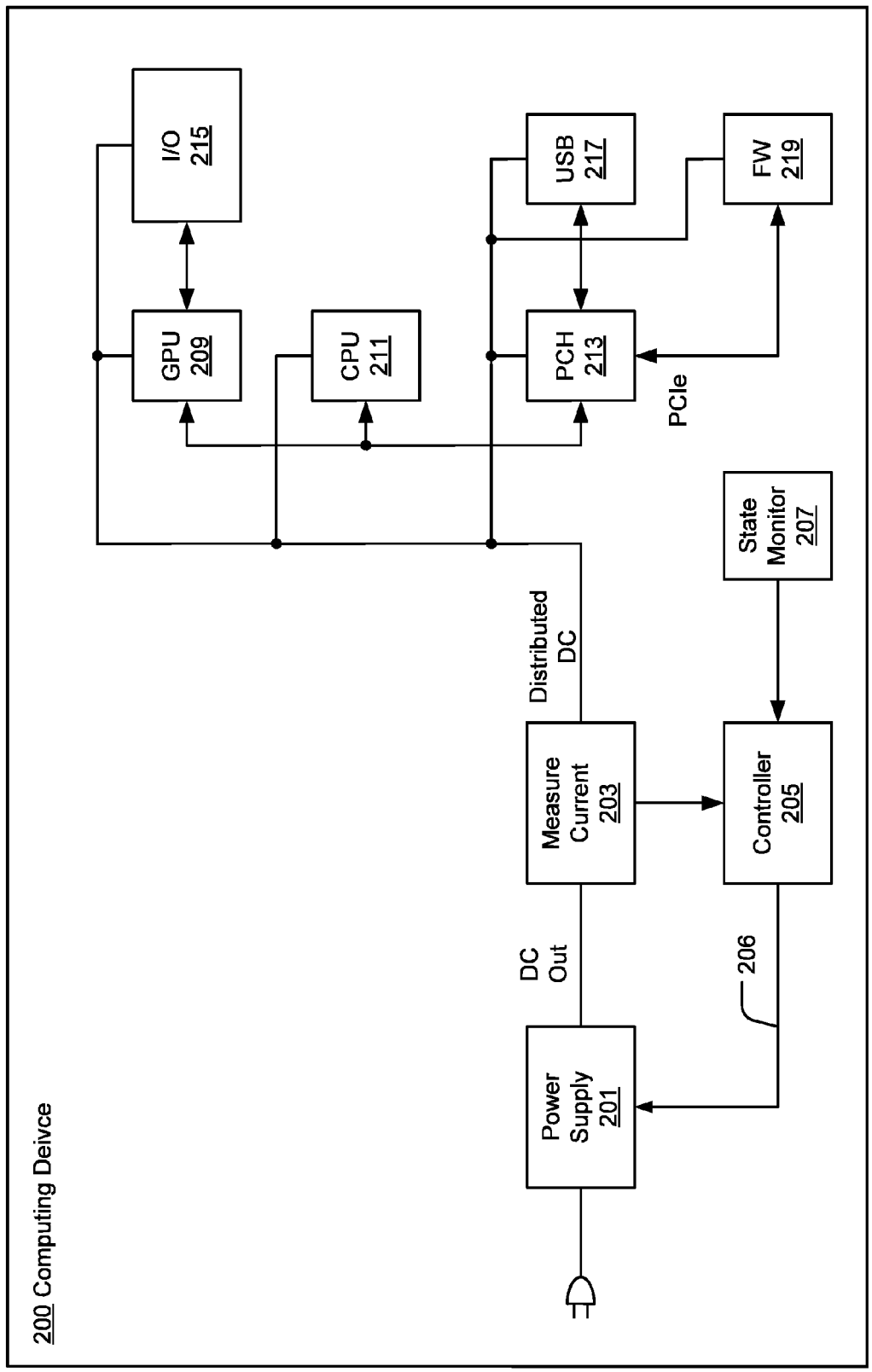
FIG. 2 is a simplified block diagram of one embodiment of computing device.

FIG. 2 is a simplified block diagram of one embodiment of computing device 200. The block diagram shows many components that can be included in many computing devices, however many other possible components are not illustrated to simplify the drawing. Furthermore, some of the components illustrated may be omitted according to some implementations of embodiments of the invention. Any such modifications should be considered to be within the scope of the present disclosure.

Computing device 200 can include switching power supply 201, central processing unit (CPU) 211, graphic processing unit (GPU) 209 and platform controller hub (PCH) 213. Switching power supply 201 can provide power for GPU 209, CPU 211, PCH 213 and other components associated with computing device 200. In one embodiment, power from switching power supply 201 is coupled to computing device 200 components through current measuring device 203. Current measuring device 203 can take many forms such as voltage comparators, inductive current sensors or any other suitable mechanism.

Output of GPU 209 can be coupled to an output connector such as I/O connector 215. I/O connector 215 may be any suitable connector, including a Thunderbolt™ connector. Similarly, one output of PCH 213 can be coupled to USB connector 217. Firewire™ connector 219 can be coupled to PCH 213 through a PCI-E bus. As shown, I/O connector 215, USB 217 and Firewire™ connector 219 can supply power to connected devices from switching power supply 201. Supplied power can be provided to external USB, Firewire™, or Thunderbolt™ clients. For example, a user can charge a cell phone or other accessory through USB 217.

Computing device 200 can include a burst-mode controller 205. The burst-mode controller 205 can determine when power supply 201 should operate in burst-mode or non-burst mode. Non-burst mode is a mode of operation defined by the power supply 201 operating at a normalized or target switching frequency (e.g., normal power output). Burst mode is a mode of operation defined by the power supply 201 operating in variable switching frequency "bursts". Burst-mode controller 205 can monitor current supplied by power supply 201 through current measuring device 203 and also monitor operational states of computing device 200 through state monitor 207. Burst-mode controller 205 can be coupled to state monitor 207 and can be configured to determine operational states of computing device 200 from state monitor 207. Burst-mode controller 205 can also be coupled to power supply 201. In one embodiment, the burst-mode controller 205 can control when power supply 201 operates in burst-mode and non-burst mode. For example, burst-mode controller 205 may issue a burst-mode enable or disable signal 206 configured to selectively control modal operation of the power supply 201.

Figure 3:
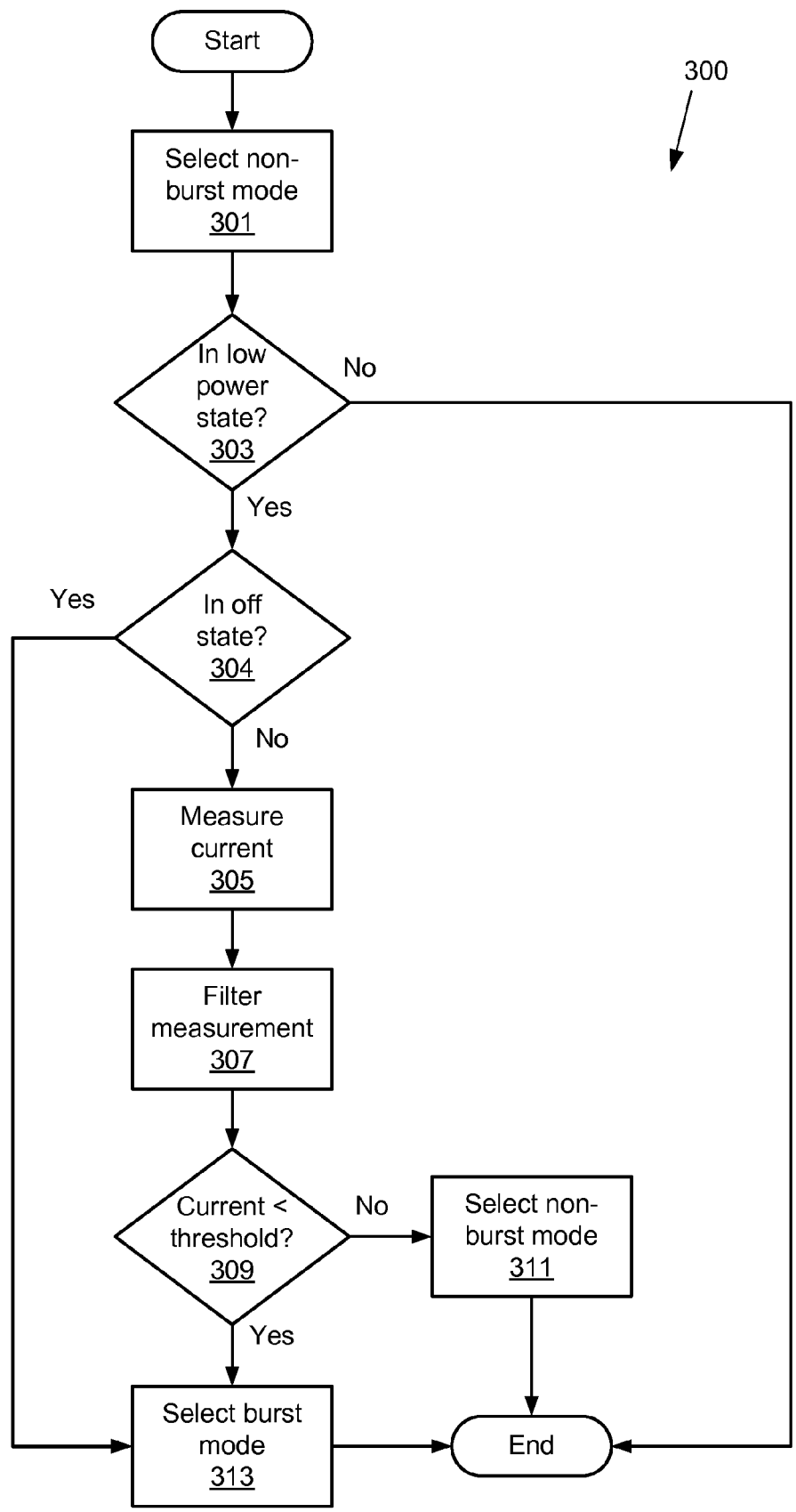
FIG. 3 is a flow chart of method steps for controlling burst-mode operation of power supply, according to an embodiment of the invention.

FIG. 3 is a flow chart of a method 300 for controlling burst-mode operation of power supply 201. The following method 300 is described as being performed by burst-mode controller 205. In other embodiments, the method can be performed by a processor, a state machine, a combination of hardware and software or the like. The method 300 begins in step 301 when burst-mode controller 205 can select non-burst mode operation for power supply 201. Next in step 303, burst-mode controller 205 can determine if computing device 200 is in a low power state. A low power state can be off state 101, sleep state 103, charge state 110 or any other predefined, predetermined, or desired operating state. In one embodiment, state monitor 207 can monitor different signals included in computing device 200 to determine operational state. If computing device 200 is not in a low power state, then the method ends.

If, on the other hand, computing device 200 is in a low power state, then burst mode controller 205 can determine if computing device 200 is in an off state at step 304. If computing device 200 is in an off state, then in step 313 burst mode can be selected and the method ends. On the other hand, if the computing device 200 is not in an off state, then in step 305 current supplied by power supply 201 can be measured.

In step 307, the current measurement can be filtered. In one embodiment, current measurements can be averaged over a predetermined period of time. In other embodiments, other filtering techniques can be used such as low pass filtering, measurement spike removal or the like. In step 309, the filtered current measurement can be compared against a predetermined threshold. If the measured current is less than the threshold, then the burst-mode controller 205 can select burst-mode operation for power supply 201 and the method ends. On the other hand, if the measured current is greater than the threshold, then the burst-mode controller 205 can select non-burst mode operation for power supply 201 and the method ends.

In some embodiments, burst mode operation can be determined by an examination of the operational state of the computing device 200 without the additional steps of current measurement. In such an embodiment, steps 305 and 307 can be optional as shown in FIG. 3.

The method 300 of FIG. 3 can describe the conditions when power supply 201 is not yet in burst-mode, but conditions can exist that could make selection of burst mode preferable. In some embodiments, after a selection of burst-mode, method 300 can be executed again. During this execution, the predetermined threshold described in step 309 can change. Such a change can effectively implement hysteresis to prevent rapid oscillation between burst and non-burst mode operation.

If an operating aspect of computing device 200, such as software or an operating system, is made aware of an operating condition that can consume slightly more power than a predetermined amount, then burst-mode selection for the power supply 201 can be affected. For example, if the user plans to charge a USB accessory while computing device 200 is in sleep state 103, the user can "register" the device indicating that an increased power draw can be expected by the burst-mode controller 205.

Figure 4:
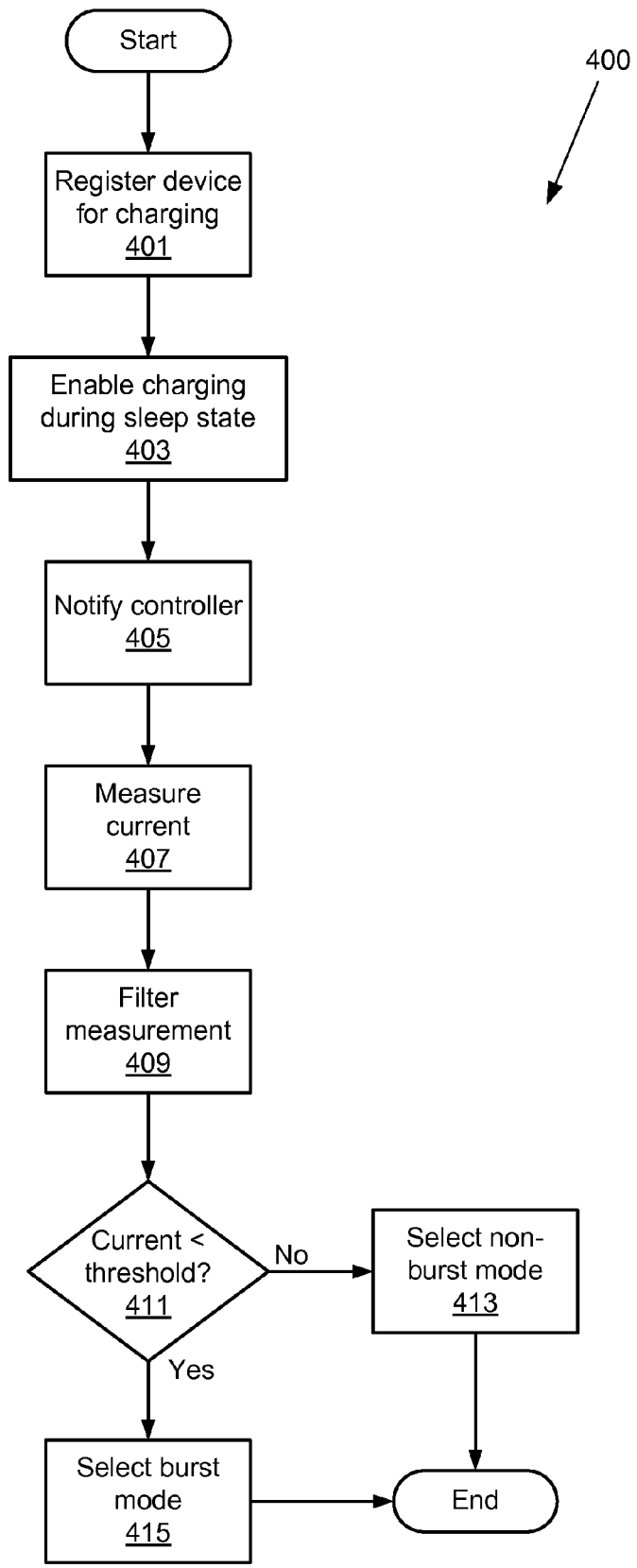
FIG. 4 is a flow chart of another embodiment of method steps for controlling a power supply, according to an embodiment of the invention.

FIG. 4 is a flow chart of a method 400 for controlling a power supply 201. The method begins in step 401 when a device to be charged through a peripheral port is registered. In one embodiment, the registration event can occur through software. Registration can indicate that power draw during a low power state can occur. In one embodiment, burst-mode controller 205 is informed that if computing device 200 enters low power state (such as off 101 or sleep 103), slightly more power can be supplied by power supply 201. In step 403 charging can be enabled when computing device 200 enters sleep state 103. In one embodiment, power, such as 5 volts DC, can be supplied to peripheral connectors, such as USB connector 217 when computing device 200 is in sleep state 103. In other designs of computing device 200, power can be coupled to Thunderbolt™ or I/O connector 215, or Firewire™ connector 219 during sleep state 103.

In step 405, burst-mode controller 205 can be notified that a registered device can be present for charging. In one embodiment, state monitor 207 can monitor not only computing device 200 operational state, but also the presence of accessory devices coupled to a peripheral port. In step 407 current can be measured and in step 409, the current measurements can be filtered. In step 411, the filtered current measurements are compared against a predetermined threshold. If the current is greater than the threshold, then non-burst mode operation can be selected for power supply 201 and the method ends. On the other hand, if current is less than the threshold, then in step 415 burst-mode operation can be selected for power supply 201 and the method ends.

In another embodiment, peripheral connectors, such as USB connector 217, Thunderbolt™ or I/O connector 215, and Firewire™ connector 219 can be configured to detect when a connector has been inserted. If a connector has been inserted, then the burst-mode controller 205 can assume that some power can be provided to the peripheral connectors and, as such, may require slightly more power than off state 101 or sleep state 103. Therefore, to avoid unnecessary acoustic noise, burst-mode controller 205 can select non-burst mode operation for power supply 201 for a predetermined or desired amount of time, for example during the active charging or powering of an accessory device.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling operations or as computer readable code on a computer readable medium for controlling power supply states in a computing device in operative communication with a switching power supply. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for controlling a power supply that is operable in at least two operating modes, the method comprising:
    by a controller connected to the power supply:
    measuring a current supplied to a computing device by the power supply when an operational state of the computing device is determined to be in a low power state; and
    configuring the power supply to operate in an operating mode of the at least two operating modes when the current is greater than a predetermined current, wherein the operating mode reduces an audible noise of the power supply, and the power supply operates at a normalized switching frequency in the operating mode.

2. The method of claim 1, wherein the operating mode of the at least two operating modes of the power supply is a non-burst mode of operation.

3. The method of claim 1, wherein another operating mode of the at least two operating modes is a burst mode of operation.

4. The method of claim 3, wherein the burst mode of operation is a mode defined by the power supply operating with variable switching frequency bursts.

5. The method of claim 4, further comprising:
    when the current is less than the predetermined current and the operational state of the computing device is the low power state, configuring the power supply to operate in the burst mode of operation using a dedicated feedback control line from the controller to the power supply.

6. The method of claim 1, wherein measuring the current supplied to the computing device by the power supply comprises:
    measuring a set of sampled currents supplied to the computing device by the power supply over a predetermined time period; and
    filtering the set of sampled currents supplied to the computing device by the power supply to obtain the current.

7. The method of claim 1, wherein measuring the current supplied to the computing device by the power supply comprises:
    measuring a set of sampled currents supplied to the computing device by the power supply over a predetermined time period; and
    averaging the set of sampled currents to obtain the current supplied to the computing device by the power supply.

8. The method of claim 1, wherein measuring the current supplied to the computing device by the power supply comprises:
    measuring a set of sampled currents supplied to the computing device by the power supply over a predetermined time period; and
    performing spike removal on the set of sampled currents to obtain the current supplied to the computing device by the power supply.

9. A controller for controlling a power supply that is operable in at least two operating modes, the controller comprising:
    control circuitry that is configured to perform steps that include:
    detecting a presence of a device coupled to a peripheral port of a computing device for charging when an operational state of the computing device is determined to be in a low power state;
    measuring a current supplied to the computing device by the power supply; and
    configuring the power supply to operate in an operating mode of the at least two operating modes when the current is greater than a predetermined threshold current to reduce an audible noise of the power supply, wherein the power supply operates at a normalized switching frequency in the operating mode.

10. The controller of claim 9, wherein the operating mode of the at least two operating modes of the power supply is a non-burst mode of operation.

11. The controller of claim 9, wherein a different operating mode of the at least two operating modes is a burst mode of operation.

12. The controller of claim 11, wherein the burst mode of operation is a mode defined by the power supply operating with variable switching frequency bursts or fixed switching frequency bursts.

13. The controller of claim 12, wherein the steps further include:
    when the current is less than the predetermined threshold current and the operational state of the computing device is the low power state, configuring the power supply to operate in the burst mode of operation.

14. The controller of claim 9, wherein the steps further include:
    registering the device for charging through the peripheral port of the computing device; and
    enabling charging by providing power to the peripheral port of the computing device from the power supply.

15. The controller of claim 9, wherein measuring the current supplied to the computing device by the power supply comprises:
    measuring a set of sample currents supplied to the computing device during a predetermined time period and when the operational state of the computing device is in the low power state; and
    filtering the set of sample currents supplied to the computing device by the power supply to obtain the current.

16. A computing device, comprising:
    a peripheral port configured to receive power from a peripheral device when the computing device is determined to be in a low power state;
    a current sensor configured to measure a current supplied to the computing device by the peripheral device when an operational state of the computing device is in the low power state; and a controller in communication with the peripheral device, the controller configured to cause the peripheral device to operate in an operating mode of at least two operating modes when the current is greater than a current threshold, wherein the operating mode reduces noise of the peripheral device as a result of the peripheral device operating at a normalized switching frequency.

17. The computing device of claim 16, wherein the operating mode of the at least two operating modes of the peripheral device is a non-burst mode of operation.

18. The computing device of claim 16, wherein the current threshold is a variable threshold.

* * * * *